3,725,061
METHOD OF PRODUCING AND USING A PHOTO-
CONDUCTIVE RECORDING MEDIUM
Karel Verhille, Mortsel-Antwerp, and André Jan Conix, Antwerp, Belgium, assignors to Agfa-Gevaert N.V., Mortsel, Belgium
No Drawing. Continuation-in-part of application Ser. No. 872,424, Oct. 29, 1969, which is a continuation of application Ser. No. 560,844, June 27, 1966, both now abandoned. This application June 11, 1971, Ser. No. 152,442
Claims priority, application Great Britain, June 25, 1965, 27,129/65
Int. Cl. G03g 5/08
U.S. Cl. 96—1.8          6 Claims

ABSTRACT OF THE DISCLOSURE

A method of producing an electrophotographic recording material, which comprises
(1) dissolving in an aqueous medium
   (a) a melamine-formaldehyde having free methylol groups and selected from a melamine-formaldehyde resin, a urea-formaldehyde resin and mixtures thereof, and
   (b) a water-soluble salt of a volatile base and a copolymer of vinyl acetate and an $\alpha,\beta$-ethylenically unsaturated compound containing a carboxylic acid group, having $a/b$ varying in parts by weight from $5/95$ to $60/40$,
(2) dispersing photoconductive particles in said medium,
(3) coating said medium on a conductive support, and
(4) curing the coated photoconductive layer on drying.

The photoconductive substance is preferably photoconductive zinc oxide and the mixture of binding agents preferably consists of (a) melamine-formaldehyde resin and (b) a salt of ammonia and a copoly(vinylacetate/crotonic acid) which contains at least 90 mol percent of vinyl acetate groups in a ratio of $a/b$ varying in parts by weight from $5/95$ to $60/40$.

---

This application is a continuation-in-part of U.S. patent application Ser. No. 872,424 filed Oct. 29, 1969, now abandoned, which was in turn a streamlined continuation of U.S. patent application Ser. No. 560,844 filed June 27, 1966, and now abandoned.

This invention relates to recording members suitable for use in electrophotography and to processes of producing same.

Photoconductive binder type coatings prepared by incorporating a finely divided photoconductor in a binder are well known. Such coatings offer certain advantages over the rigid selenium coatings in respect of their flexibility and their fitness for being spectrally sensitized.

In such coatings, various inorganic as well as organic substances can be incorporated as photoconductive substances, e.g. sulphur, selenium, the oxides, sulphides and selenides of zinc, cadmium, mercury, antimony, bismuth and lead, anthracene, anthraquinone and more recently discovered organic monomeric and polymeric organic photoconductors, such as e.g. those described in the Belgian patent specification 587,300, the United Kingdom patent specifications 964,871, 964,873, 964,874, 964,875, 964,876, 964,877, 964,879 970,937, 980,879 and 980,880, in the German patent specification 1,058,836, and in the Canadian patent specification 568,707.

The use of photoconductive substances combined with insulating binder agents is known among others from the U.S. patent specifications 2,197,552, 2,297,691, 2,485,589, 2,551,582 and 2,599,542 and from the United Kingdom patent specification 566,278, 693,112 and 700,502.

Phosphor type photoconductive materials and specially doped cadmium sulphide dispersed in a silicone resin binder, are described by E. Wainer Photogr. Eng. 3 (1952) 12. Such layers are suitable for image formation by persistent internal polarization, which technique has been described by H. P. Kallmann and J. Rennert, Electronics, Aug. 28, 1959, pp. 39–41. Thermoplastic recording layers containing a thermoplastic photoconductive polymer or thermoplastic polymer with a photoconductor dissolved or dispersed therein are suitable for the thermoplastic recording technique described in the United Kingdom patent specification 964,881.

C. I. Young and H. G. Greig, R.C.A. Rev. 15 (1954) 469, describe an electrophotographic material containing a photoconductive layer comprising a specially prepared photoconductive zinc oxide in an insulating resin binder. Said layer is coated on a sufficiently conductive paper base, e.g. a clay-coated paper, from a paint-like coating mixture by conventional paper-coating techniques. Since the zinc oxide has a brilliant white colour it forms an excellent base for contrasting with the developer materials applied to it.

According to existing techniques, the photoconductive binder coatings are prepared by dispersing or dissolving the photoconductive substances in a solution of an insulating binder, and by applying them as such in the form of a layer to an appropriate relatively conductive support.

Now we have found that a photoconductive recording member having interesting properties for recording electromagnetic radiation images can be prepared from a dispersion of a photoconductor in an aqueous medium containing in dissolved state (a) a melamine-formaldehyde and/or a urea-formaldehyde resin, and
(b) a salt of a volatile base and copolymer of vinylacetate and a carboxylic group containing $\alpha,\beta$-ethylenically unsaturated compound, e.g. crotonic acid, acrylic acid, maleic acid, itaconic acid and methacrylic acid, which copolymer contains at least 90 mole percent of vinyl acetate groups and wherein the ratio in parts by weight of melamine formaldehyde and/or urea formaldehyde resin to said salt is preferably varying between $5/95$ and $60/40$.

As a preferred type of photoconductive recording member a recording member is used prepared from a dispersion of a photoconductor in an aqueous medium containing in dissolved state (a) a melamine-formaldehyde and/or a urea-formaldehyde resin and (b) a salt of a volatile base and a copoly(vinyl acetate/crotonic acid), which contains at least 90 mole percent of vinyl acetate groups, the ratio in parts by weight of melamine-formaldehyde and/or urea-formaldehyde resin to said salt varying between $5/95$ and $60/40$.

The application of aqueous coating compositions requires no special coating techniques and offers all the advantages associated with the absence of organic solvents in the coating composition.

The recording element prepared according to the present invention possesses the property of regaining very rapidly, after charging and exposure, its original dark-resistivity so that this element is extraordinarily suitable for multi-colour reproduction wherein generally at least two successive chargings and exposures of the elements are required.

The recording element prepared according to the present invention is flexible, possesses a very good mechanical strength and shows a strong adhesion to a paper support as well as to a metal support, e.g. an aluminium support.

Due to a cross-linking reaction on drying between the copolymer of vinyl acetate and crotonic acid and the melamine-formaldehyde of urea-formaldehyde resin, a photoconductive coating according to the present invention offers the advantage of a very high resistance to alkaline aqueous liquids as well as to non-polar organic solvents.

The curing of the recording layer may take place by drying at room temperature but is speeded up by carrying out the drying at elevated temperature e.g. between 25 and 100° C.

By virtue of the curing and insolubilization, the recording layers are very well suited for electrophotographic reproduction techniques wherein use is made of an insulating hydrocarbon liquid containing charged pigment particles (electrophoretic development).

Further has been stated that a recording element prepared from a dispersion of photoconductive zinc oxide in the above described aqueous solution containing the binding agent combination of copoly(vinyl acetate/crotonic acid) and melamine-formaldehyde and/or urea-formaldehyde resin possess the property of being more light-sensitive (higher charge decay for same exposure) than a recording element wherein the said copoly(vinyl acetate/crotonic acid) is used separately. The melamine-formaldehyde or urea-formaldehyde resin used separately as a binder does not exhibit a volume resistivity high enough to keep a charge for a long time.

The dark-resistivity and resistance to moisture of the recording element, when containing photoconductive zinc oxide, may be increased e.g. by the use of at least one of the acid compounds, preferably the organic derivatives of oxyacids derived from phosphorus, described in Belgian patent specification 612,102.

The photoconductive zinc oxide-containing recording elements according to the present invention are also suited for electrophotographically preparing planographic printing plates, when cured for a few minutes at 100° C. The hydrophilization of the non-printing areas can be carried out in common way without difficulties.

Two basic types of melamine resins are commercially available for use in the photoconductive coating compositions of the present invention: unmodified and modified (etherified) melamine-formaldehyde polymers. Both types are marketed as spray-dried powders and as solutions of about 60% of solid resin in water. The solutions may contain some alcohol for improvement of the storage stability. Spray-dried resin powders are produced under the trade name "Cymel" by American Cyanamid Company, New York, N.Y., U.S.A. and under the trade name "Resimene" by Monsanto Chemical Company, St. Louis, Mo., U.S.A. Melamine resin solutions are marketed under the trade name "Catalin Resin" by Reichhold Chemicals Inc., White Plains, N.Y., U.S.A.

The water-soluble melamine-formaldehyde resins contain at least 2 moles of formaldehyde per mole of melamine.

As suitable melamine-formaldehyde resins containing several N-methylol groups may further be mentioned: dimethylolmelamine (e.g. Resloom HP of Monsanto Chemical Company); dimethyltrimethylolmelamine (Aerotex M–3 or Parez 613 of American Cyanamid Company); trimethylolmelamine (Aerotex 605 or Parez 607 of American Cyanamid Company); tetramethylolmelamine (Resloom HP Special, Monsanto Chemical Company), tetramethylpentamethylolmelamine (Resloom LC–48, Monsanto Chemical Company); tetramethylhexamethylolmelamine and pentamethylhexamethylolmelaine.

More particularly suitable melamine-formaldehyde resins are listed in following Table 1.

TABLE 1

(1) Parez Resin 613 (a dimethyltrimethylolmelamine marketed by American Cyanamid Company).
(2) Parez Resin 607 (a melamine-formaldehyde resin marketed by American Cyanamid Company).
(3) Epok-W–9801 (a 72 to 75% aqueous solution of a melamine-formaldehyde resin marketed by British Resin Products Ltd., London).
(4) Cymel 405 (a melamine-formaldehyde resin marketed by American Cyanamid Company).
(5) Resloom HP (dimethyltrimethylolmelamine marketed by Monsanto Chemical Company).
(6) Cassurit-MLP (partially etherified melamine-formaldehyde resin marketed by Cassella Farbwerke Mainkur A.G. Frankfurt (Main)—Fechenheim, W. Germany).

As a particularly suitable water-soluble urea-formaldehyde resin is mentioned the one marketed under the name Urecoll P by Badische Anilin- & Soda-Fabrik, A.G., Ludwigshafen/Rhine, W. Germany.

Copolymers of vinyl acetate and crotonic acid, which are especially suitable for application in the present invention, contain preferably at least 90 mole percent of vinyl acetate groups and sufficient crotonic acid groups to enable the solubilization in water by means of a volatile base. The molecular weight of the copolymer is not critical since a cross-linking process takes place on drying. Preferably, however, copolymers of vinyl acetate and crotonic acid are used having a molecular weight of at least 25,000.

As an example of a very suitable copolymer is mentioned copoly(vinyl acetate/crotonic acid) marketed as Vinac ASB–516 by Air Reduction Chemical and Carbide Company, New York, N.Y., U.S.A.

As volatile bases that are suited for being used in the preparation of photoconductive layers according to the present invention may be mentioned: ammonia, methylamine, dimethylamine, trimethylamine, ethylamine, diethylamine, triethylamine, propylamine, isobutylamine, n-butylamine, ethylenediamine, allylamine, hydrazine, morpholine and piperidine. The use of ammonia is preferred. The pH of the coating composition from which the layer is applied preferably lies between 8 and 11.

The combination of melamine-formaldehyde and/or urea-formaldehyde condensate and resin salt of a volatile base for application in the present invention is always chosen in such a way that an aqueous solution is obtained.

The higher the acid number or content of acid groupings in the salt-forming resin and the higher the content of methylol groups in the melamine or urea polymer, the faster the cure on simply drying. In order to accelerate the curing, some free formaldehyde or a compound setting free formaldehyde may be used in the coating composition.

The order of mixing steps for the constituents to form the coating is not important. Since known photoconductive substances are not water-soluble they have to be dispersed preferably with a dispersing agent that does not markedly lower the dark-resistivity of the photoconductive element.

The quantitative ratios of the photoconductive substances to the binding agents may vary within wide limits. It is preferred to apply the photoconductive substance in a ratio of 1 part by weight of photoconductive substance to 0.1 to 0.6 part by weight of total content of binder. The thickness of the photoconductive layer may be chosen between wide limits according to the requirements of each case. Good recording and reproduction results are attained with electrophotographic layers of a thickness between 1 and 20$\mu$, and preferably between 3 and 10$\mu$. Too thin layers possess an insufficient insulating power, whereas too thick layers require long exposure times. Preferably, the coating mixture contains dispersed photoconductive zinc oxide in a ratio of 95% to 60% in respect of the total solid content of the coated and dried layer.

The photoconductive recording layers prepared according to the present invention may contain, in addition to the photoconductive substance(s) and binder optical sensitizers, e.g., those mentioned in Belgian patent specification 612,102 and additives known in coating techniques, e.g., pigments (see e.g. Belgian patent specification 609,-056), compounds influencing the gloss and/or the viscosity, and compounds which counteract ageing and/or oxidation of the layers, or which influence the thermal stability of the layers. When selecting any additives preference is given to those additives, which least reduce the dark resistivity of the photoconductive layer.

The photoconductive coating composition according to the present invention may be coated on a support by a known coating technique, e.g. by spraying, whirling, dip-coating or by a coating technique wherein use is made of a doctor blade. The supports or base materials are chosen in view of the particular charging, exposing, recording, developing and/or transfer technique wherein the recording material is to be used.

In electrophotographic recording techniques wherein the photoconductive layer is electrostatically charged, the support has preferably an electric volume resistivity considerably lower than that of the recording layer. Suitable supports are described, e.g., in Belgian patent specifications 602,794, 610,060 and 612,102 and in United States patent specification 3,008,825.

The photoconductive layer of an electrophotographic material prepared starting from a coating composition according to the present invention can be used for recording purposes wherein prior to exposure to activating electromagnetic radiation an electric charge is nondifferentially applied according to known methods. The material can, however, also be used in recording techniques wherein the exposure step precedes a charging step. For such a technique we refer, e.g. to Belgian patent specification 625,335.

The obtained charge pattern may be developed in a known way by finely-divided electrostatically attractable material e.g. by using dry toner particles or such particles dispersed in an insulating liquid.

The following examples illustrate the present invention.

Example 1

The improved light-sensitivity of different photo-conductive compositions prepared from a mixture of a photoconductor, a copoly(vinyl acetate/crotonic acid) and a melamine-formaldehyde resin compared with compositions prepared from said photoconductor and copoly(vinyl acetate/crotonic acid) and melamine resin separately is illustrated in Table 2.

To 20 g. of photoconductive zinc oxide 5 g. of a binder composition composed as indicated in percent by weight in Table 2, 5 ccs. of concentrated aqueous ammonium hydroxide and 50 ccs. of water are added. The whole composition having a pH higher than 8 is ground for 2 h. in a ball-mill and thereafter coated on an aluminium-coated paper support pro rata of 150 ccs./sq. m.

The coated layers are dried at room temperature from 3 h. and then under the same circumstances negatively charged by corona discharge.

To compare the light-sensitivity the recording layers containing mixtures of binders as indicated in Table 2 are exposed in the same way through a step-wedge having a constant of 0.1 and developed with an electrophoretic developer of the positive type.

In the print of the step-wedge the number of steps not developed with developing powder is an indication for the light-sensitivity of the recording materials.

TABLE 2

| Percent by weight of copoly-(vinyl acetate/crotonic acid) (94.4/5.6) | Percent by weight of melamine-formaldehyde resin of number 1 of Table 1 | Number of non-developed steps (relative scale) | Charge level (V) |
|---|---|---|---|
| 100 | 0 | 0 | 369 |
| 90 | 10 | | 4200 |
| 80 | 20 | 3 | 295 |
| 70 | 30 | 5 | 360 |
| 60 | 40 | 4 | 360 |
| 50 | 50 | 3 | 141 |
| 40 | 60 | 21 | <5 |
| 30 | 70 | 00 | <5 |

Analog results are obtained with other copolymers of vinyl acetate and crotonic acid, the mol percent of crotonic acid of which lies between 10 and 2.

The above cited compositions having from 90 to 40% by weight of the mentioned copolymer are very suited for application in recording materials intended for producing multicolour images needing at least two successive chargings and exposures of the recording element.

Example 2

Example 1 is repeated but the electrophotographic coating compositions are applied to a glassine type paper support pro rata of 150 ccs./sq. m.

Example 3

The following compositions 1 to 6 for coating a photoconductive recording layer are prepared and compared in respect of their chargeability, expressed in Table 4 by their maximum density, and in respect of their sensitivity expressed in Table 3 by the number of non-blackened steps after exposure to a same step-wedge.

COMPOSITIONS

| | 1 | 2 | 3 | 4 | 5 | 6 |
|---|---|---|---|---|---|---|
| Photoconductive zinc oxide, g | 20 | 20 | 20 | 20 | 20 | 20 |
| Water, ccs | 25 | 25 | 25 | 25 | 25 | 25 |
| A 10% ethanolic solution of acid butyl phosphate, ccs | 0.41 | 0.41 | 0.41 | 0.41 | 0.41 | 0.41 |
| Poly(vinyl acetate/crotonic acid) (94.4/5.6), g | 3.1 | 3.0 | 2.9 | 3.1 | 3.0 | 2.9 |
| Aqueous ammonia solution (28%), ccs | 3.1 | 3.1 | 3.1 | 3.1 | 3.1 | 3.1 |
| Water, ccs | 25 | 25 | 25 | 25 | 25 | 25 |
| Urecoll P (trade name), g | 0.9 | 1.0 | 1.1 | | | |
| Resloom HP (trade name), g | | | | 0.9 | 1.0 | 1.1 |

These compositions are ball-milled for 2 hours.

After ball-milling, the compositions are sensitized by mixing them with 8 ccs. of 0.1% ethanolic solution of the compound of the formula

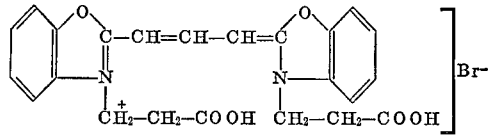

and 12 ccs. of 0.1% ethanolic solution of chrome Azurol S (C.I. 43,825).

The obtained compositions are coated on a glassine type paper at the respective rates listed in Table 3 below.

TABLE 3

| Composition: | G. of zinc oxide per sq. m. |
|---|---|
| 1 | 26.2 |
| 2 | 23.3 |
| 3 | 26.4 |
| 4 | 32.2 |
| 5 | 30.4 |
| 6 | 28.6 |

When dried and dark-adapted the different layers are charged and exposed as explained in Example 1, whereupon the sensitometric characteristics listed in Table 4 are obtained.

TABLE 4

| Composition | Maximum density | Sensitivity |
|---|---|---|
| 1 | 1.47 | 23 |
| 2 | 1.55 | 22 |
| 3 | 1.61 | 20 |
| 4 | 1.51 | 23 |
| 5 | 1.57 | 22 |
| 6 | 1.42 | 23 |

We claim:

1. A method of producing an electrophotographic recording material, which comprises (1) dissolving in an aqueous medium a mixture of
    (a) a formaldehyde resin having free methylol groups and selected from a melamine-formaldehyde resin, a urea-formaldehyde resin and mixtures thereof, and (b) a water-soluble salt of a volatile base and a copolymer of vinyl acetate and an $\alpha,\beta$-ethylenically unsaturated compound containing a carboxylic acid group, having $a/b$ varying in parts by weight from $5/95$ to $60/40$.

(2) dispersing photoconductive particles in said medium, (3) coating said medium on a conductive support, and (4) curing the coated photoconductive layer on drying.

2. A method according to claim 1, wherein said mixture is a mixture of (a) a melamine-formaldehyde resin and (b) a salt of a volatile base and a copoly(vinyl acetate/crotonic acid) which contains at least 90 mole percent of vinyl acetate groups in a ratio of $a/b$ varying in parts by weight from $5/95$ to $60/40$.

3. A method according to claim 1, wherein the coated layer has been cured by heating between 25 and 100° C.

4. A method according to claim 1, wherein the photoconductive particles are photoconductive zinc oxide particles.

5. A method according to claim 1, wherein the volatile base is ammonia.

6. A method of reproducing an original by the creation of a pattern of electrostatically charged and uncharged areas according to said original on a supported photoconductive layer said layer being prepared according to the method described in claim 1 and including the steps said layer to an image of electromagneticile-
of electrostatically charging said layer and exposing said layer to an image of electromagnetic radiation to discharge said layer in accordance therewith and developing the remaining charge pattern with finely-divided electrostatically attractable material being selectively attracted by the charge of said pattern.

References Cited
UNITED STATES PATENTS

| | | | |
|---|---|---|---|
| 3,152,895 | 10/1964 | Tinker et al. | 96—1 |
| 3,160,503 | 12/1964 | Cady | 96—1 |
| 2,959,481 | 11/1960 | Kucera | 96—1 |
| 2,997,387 | 8/1961 | Tanenbaum | 96—1 |

CHARLES E. VAN HORN, Primary Examiner

U.S. Cl. X.R.

96—1 PC, 1.5; 117—34